United States Patent [19]
Miller, Sr.

[11] Patent Number: 5,647,161
[45] Date of Patent: Jul. 15, 1997

[54] FISH FIGHTING APPARATUS

[75] Inventor: Daniel Corrigan Miller, Sr., Franklin, N.H.

[73] Assignee: FuturVision - Machine & Designs, Inc., Bow, N.H.

[21] Appl. No.: 509,980

[22] Filed: Aug. 1, 1995

Related U.S. Application Data

[63] Continuation-in-part of Ser. No. 399,425, Mar. 7, 1995, abandoned.

[51] Int. Cl.⁶ .......................... A01K 97/10; B63B 29/04
[52] U.S. Cl. ............... 43/21.2; 297/188.01; 297/188.21; 297/344.22; 297/344.26; 114/363
[58] Field of Search .................. 43/21.2; 297/188.21, 297/188.01, 195.1, 344.22, 344.24, 344.26, DIG. 900; 114/343, 363, 364

[56] References Cited

U.S. PATENT DOCUMENTS

| | | |
|---|---|---|
| 3,151,910 | 10/1964 | Larson .................. 297/344.2 |
| 3,747,881 | 7/1973 | Akamu .................. 43/21.2 |
| 3,851,916 | 12/1974 | Quartullo .................. 297/188 |
| 4,071,219 | 1/1978 | Seager .................. 297/188.21 |
| 4,086,676 | 5/1978 | Arruza .................. 114/363 |
| 4,278,289 | 7/1981 | Esposito .................. 297/188 |
| 4,425,863 | 1/1984 | Cutler .................. 114/363 |
| 4,460,216 | 7/1984 | Keller .................. 297/217 |
| 4,879,963 | 11/1989 | Dionne .................. 114/363 |
| 5,346,415 | 9/1994 | Waymon et al. .................. 297/344.21 |

*Primary Examiner*—Jeanne Elpel
*Attorney, Agent, or Firm*—William B. Ritchie

[57] ABSTRACT

A fish fighting apparatus for assisting an angler in the capture of large hooked fish providing an angler with a lever arm which is attached to the rod holder and which is rotatably attached to a base which is attached to the boat. The lever arm can receive force from the angler's legs via attached pedals. A rotatable, adjustable seat is also connected to the base. The base is free to rotate to allow the rod to point in the approximate direction of the fish. A drag assembly prevents unwanted movement of the chair when subjected to the effects of wave action.

14 Claims, 6 Drawing Sheets

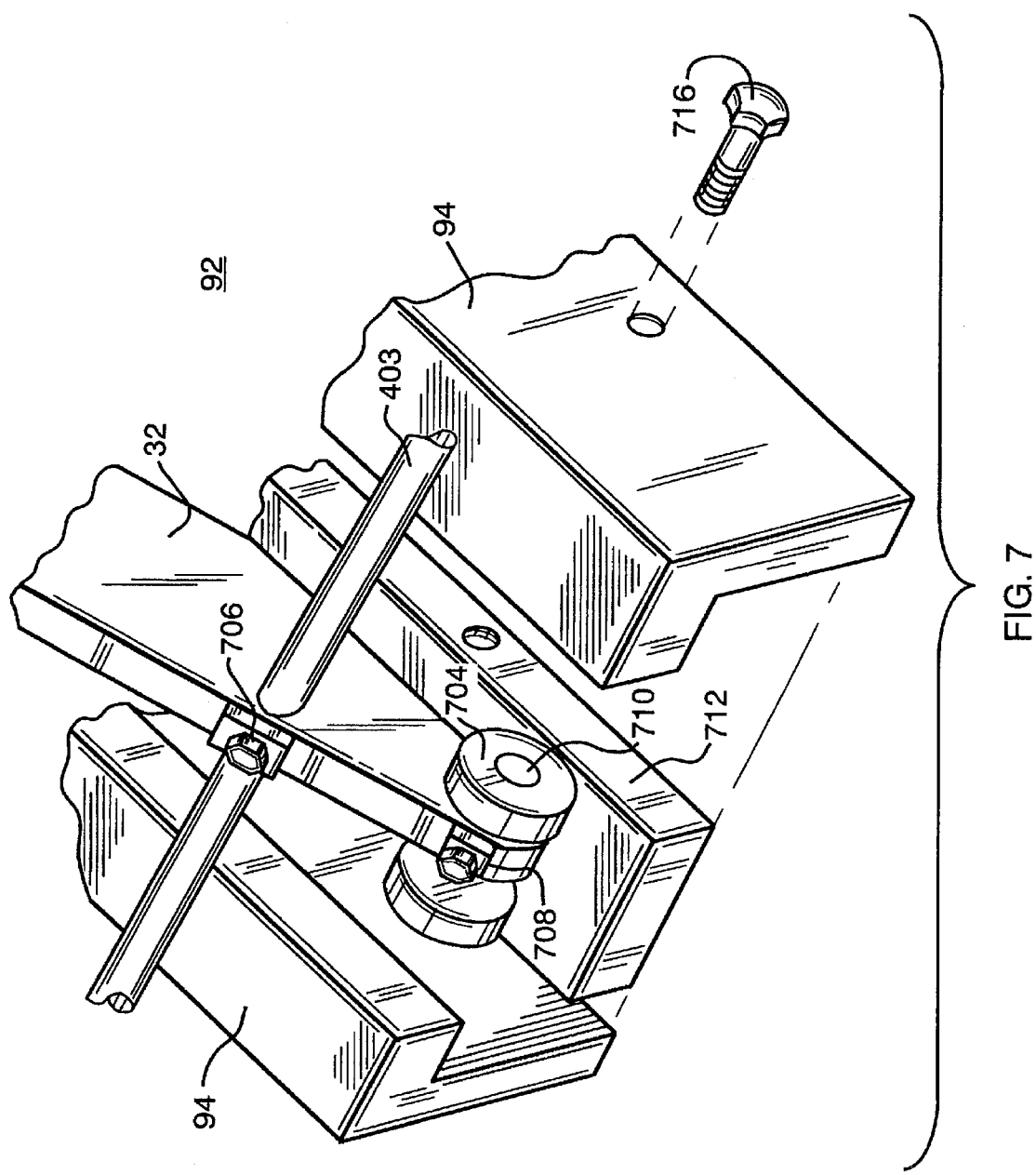

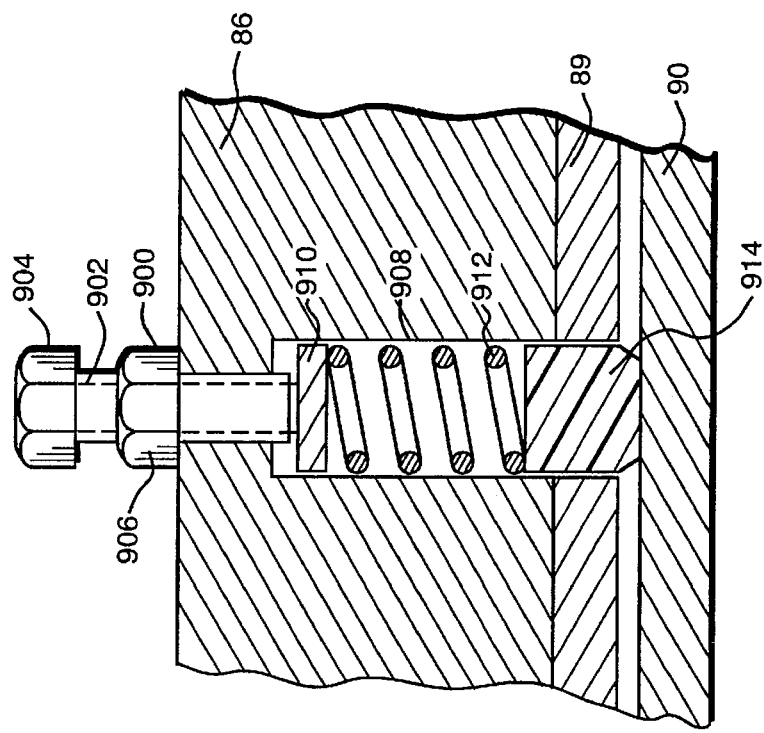
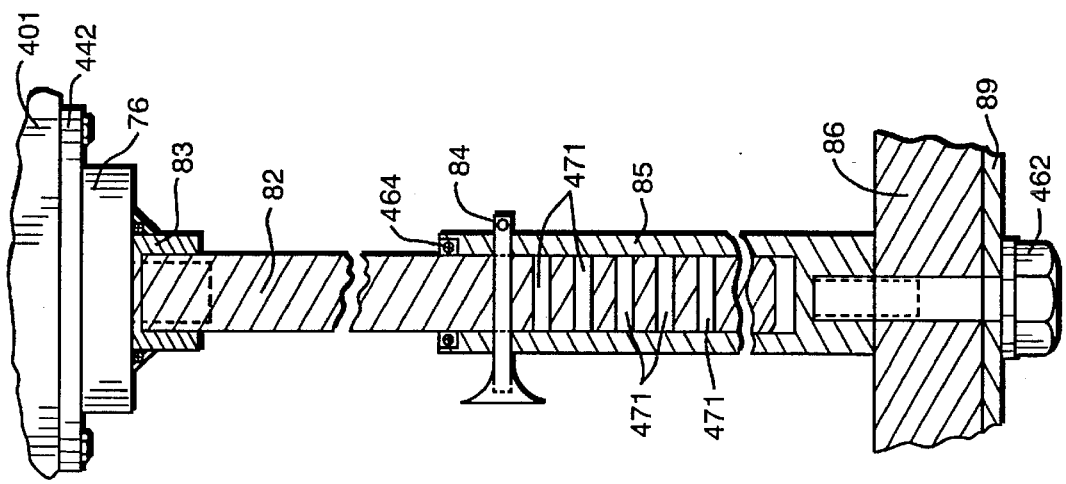

FISH FIGHTING APPARATUS

This application is a continuation-in-part of U.S. patent application Ser. No. 08/399,425, filed on Mar. 7, 1995, now abandon.

BACKGROUND OF THE INVENTION

1. Field of the Invention

The invention relates to an apparatus for assisting an angler in the capture of large fish. The invention provides an angler a mechanically advantaged fighting chair to fight and bring in a hooked fish.

2. Description of the Related Art

When fishing for large fish, such as bluefin and bigeye tuna, marlin, swordfish, and sharks, anglers typically employ multiple rods which rest in rod holders. When a fish is hooked on a particular rod, the angler removes that rod from the holder and makes his way into a fighting chair to assist in the capture of the fish. These fighting chairs are well known in the art.

Typical fighting chairs provide the angler with a place to sit while reeling in the hooked fish. The fighting chair is considered as indispensable in fighting large game fish. Fighting chairs are rated in accordance with the tackle that can be used with them. Most full sized chairs are rated for use with 80 lb line test. However, it is not uncommon for anglers to use these chairs with 130 lb tackle or even heavier line tests. The lightest gauge line is generally considered customary for only small gamefish.

Prior art fighting chairs can be rotated to allow the rod to stay aligned with the unreeled line, thus allowing line to be easily pulled off the reel or wound back onto the reel. The butt of the rod is placed in a rod holder, called a gimble, which is attached to the fighting chair. The gimble supports much of the weight of the rod. When fighting particularly large fish, the angler attaches himself to the rod or to the reel via a harness, which allows the angler to use his body weight to pull against the rod and help tire and bring in the fish. There are different types of harness: shoulder, kidney and bucket are the most common. The bucket harness is recommended for landing the largest fish.

To bring in a large hooked fish, anglers can not usually simply reel in the fish, as the reel does not possess a long enough cranking arm to enable the angler to overcome the strength and weight of the fish and thereby pull the fish to the boat. Nor, is the line that it is used strong enough to hold the fish if the animal decides to make a sudden dart away from the direction of the pole. Instead, anglers use a combination of several motions. First, the angler pulls the rod toward his body so that it pivots about the butt of the rod, and so that the tip of the rod moves from a near horizontal position to a near vertical position. This movement pulls the fish toward the boat. Then, the angler reverses the motion by quickly lowering the tip of the rod until it is in the near horizontal position. Lowering the tip of the rod creates slack in the line, which the angler reels in as the rod is being lowered. Repetition of this process gradually brings the fish to the boat. The reel that holds the line is fitted with a friction drag that is set in accordance with the strength of the line. Any pull on the line greater than the set amount, for example, when a fish tries to break free, causes the reel to pay out line as long as the pulling force is greater than the set drag force. For a human being to pull against this heavy weight for an extended period of time is extremely fatiguing.

To assist in the pulling portion of the process, fighting chairs are also known to incorporate attached footrests, which the angler pushes against with the feet while using the arms, shoulders, and body weight to pull the rod toward the near vertical position and thus pull the fish toward the boat. The position of the footrests is typically adjustable to accommodate the leg length of the angler. When landing an extremely large fish using a bucket harness, the angler raises from the seat with the bucket harness attached and allows the weight of his body to pull the fish up as the angler drops back into the chair, gaining a little line with each repetition.

One of the problems with the prior art fighting chairs is that they rely primarily upon the muscles of the upper body and back to pull the fish toward the boat. Or, as mentioned with bucket harness, leg power alone is used. Most anglers become extremely fatigued in the process of bringing in a large fish, and sometimes lose the fish because the angler does not have enough strength and energy to properly respond to the movements of the fish. Furthermore, many potential anglers, including many women, children, disabled individuals and the elderly, are deterred from attempting to bring in large game fish, because of the extreme physical strength and endurance required to do so when using the prior art fighting chairs.

Another problem with the prior art fighting chairs is that they do not easily and instantly rotate to keep the rod parallel with the line. With prior art fighting chairs, the weight of the fish upon the line produces a downward force upon the tip of the rod. This downward force is transferred to the butt of the rod, to the gimble, and to the front of the fighting chair where the gimble is attached. The downward force upon the front of the fighting chair creates a downward force upon the front of the chair's horizontal swivel joint, which creates an equal upward force upon the back of the chair's swivel joint. Thus the chair tends to bind in whatever position it is in, and the swivel only can operate with a great rotational force applied. When a fish moves so that the line is no longer parallel with the rod, it is desirable for the chair to rotate instantly so as to keep the line from rubbing against the eye at the end of the rod: Also, any sideways pull can cause the hook to be dislodged from the fish's mouth. However, for a prior art fighting chair to rotate into the desired position, a crew member must push down upon the back of the chair while rotating the chair (the angler can not usually rotate the chair because his feet are resting upon the footrest). Every time the fish changes position relative to the bow-stern axis of the boat, the chair must be rotated in this fashion.

Another problem with the prior art fighting chairs is the gimble structure makes it difficult to insert the rod. The opening of the gimble is only slightly larger than the diameter of the butt of the rod. However, with a fish on the line, the rod is very difficult to maneuver. Thus, the gimbles used on prior art fighting chairs do not provide a means for easily guiding the butt of the rod into the gimble.

Another problem with the prior art fighting chairs is that they do not provide a means for preventing the torso harness from squeezing into the sides of the angler. In present systems, the torso harness must attach to the reel which is much narrower than the shoulder width of the angler. The torso harness (functionally equivalent to a rope with a wide flat portion located midway between the two ends) is wrapped around the body of the angler and attached to the rod or reel, with the harness being widest where it touches the angler's body. Because the attachment points of the two ends of the harness to the rod or reel are co-incident or separated by only a few inches, the harness tends to squeeze the body of the angler. This squeezing can become quite uncomfortable during the time it takes the angler to bring in the fish, yet the harness becomes more important as the angler's upper body strength fades and he is forced to rely more and more upon body weight to pull the fish towards the boat.

Another problem with the prior art fighting chairs is that they do not provide a means of preventing angler injury when a line with a fish attached breaks. When an angler is pulling upon the rod, his body is only stabilized by the force of the fish upon the line. If the line breaks while the angler is pulling, the angler can be suddenly thrown off balance and may fall violently into the chair or onto the deck of the boat, sustaining a potentially severe injury. It is recommended that an angler always keep the left hand (assuming the person is right-handed) on the reel at all times to prevent the rod from hitting the angler in the face should the line break unexpectedly.

Another problem with the prior art fighting chairs is that they require the angler to slide back and forth upon the seat of the chair while bringing the fish to the boat. This sliding action is far from frictionless, and adds to the fatiguing nature of the process of bringing in the fish. In addition, because of this sliding action, an angler can not comfortably wear shorts while bringing in a fish if the angler is to avoid painful blisters on the legs.

Since the angler is responsible for setting the trolling angle of the rod, it cannot be set independently of the angler. The ideal trolling angle may be inconsistent with the angler's length of arms or upper body strength.

Safety with existing chairs is also a potential problem. In that the rod is "anchored" to angler via the harness, if the reel locks up (i.e., the drag ceases to function) or the angler's foot slips off the footrest, the angler can be pulled overboard. At least one death has resulted from such accidents.

A fish fighting apparatus that solves the above described problems is not found in the prior art.

SUMMARY OF THE INVENTION

It is the object of the invention to provide a fish fighting apparatus which uses a mechanical advantage to assist the angler in pulling the fish towards the boat.

It is still another object of the invention to provide a fish fighting apparatus which easily and instantly rotates to keep the rod parallel to the line.

It is still another object of the invention to provide a fish fighting apparatus which guides the butt of the rod into the gimble.

It is still another object of the invention to provide a fish fighting apparatus which can be used with or without a torso harness.

It is still another object of the invention to provide a fish fighting apparatus which prevents angler injury caused by the fishing line breaking while the angler is pulling the fish towards the boat.

Still another object of the invention is to provide a fish fighting apparatus which includes a seat that is adjustable as to height above the deck as well as forward and rearward positioning.

Finally, it is an object of the invention to provide a fish fighting apparatus that enables an angler to use primarily his/her legs to pull the fish towards the boat.

The invention is a fish fighting apparatus for assisting an angler in pulling a hooked fish into a boat using a fishing rod having a butt. A base having a top surface and a bottom surface which attaches said apparatus to the deck of the boat is provided. A chassis having a top surface and a bottom surface that is rotatably connected to the top surface of said base is provided. The chassis can be rotated substantially independent of the pull on the fishing rod. A vertical support member rigidly fastened to said chassis is provided. An inclined ramp is rigidly fastened to said vertical support member. A lever, having a pivotal end and a ramp end, is provided. The pivotal end of said lever is pivotally attached to said vertical member. A pedal assembly is attached to the ramp end of said lever with said pedal assembly slidably attached to said inclined ramp. A rod holder is adjustably attached to said lever, said rod holder releasably holding the butt of the rod so that the angle between the fishing rod and the boat can be set to a predetermined position and so that the fishing rod can be set at a predetermined distance relative to said vertical member. Force applied to said pedal assembly causes said pedal assembly to slide down said ramp, such that a mechanical advantage is achieved enabling the angler to pull the hooked fish toward the boat using the mechanical advantage provided by said lever.

BRIEF DESCRIPTION OF THE DRAWINGS

FIG. 7 is a detailed perspective exploded view of the inclined ramp with part of the foot pedal assembly showing the foot pedal assembly in its track.

FIG. 8 is detailed front cross-sectional view of the adjustable seat support post.

FIG. 9 is a detailed cross-sectional view of the drag pressure assembly

DETAILED DESCRIPTION OF THE INVENTION

Figure 1:
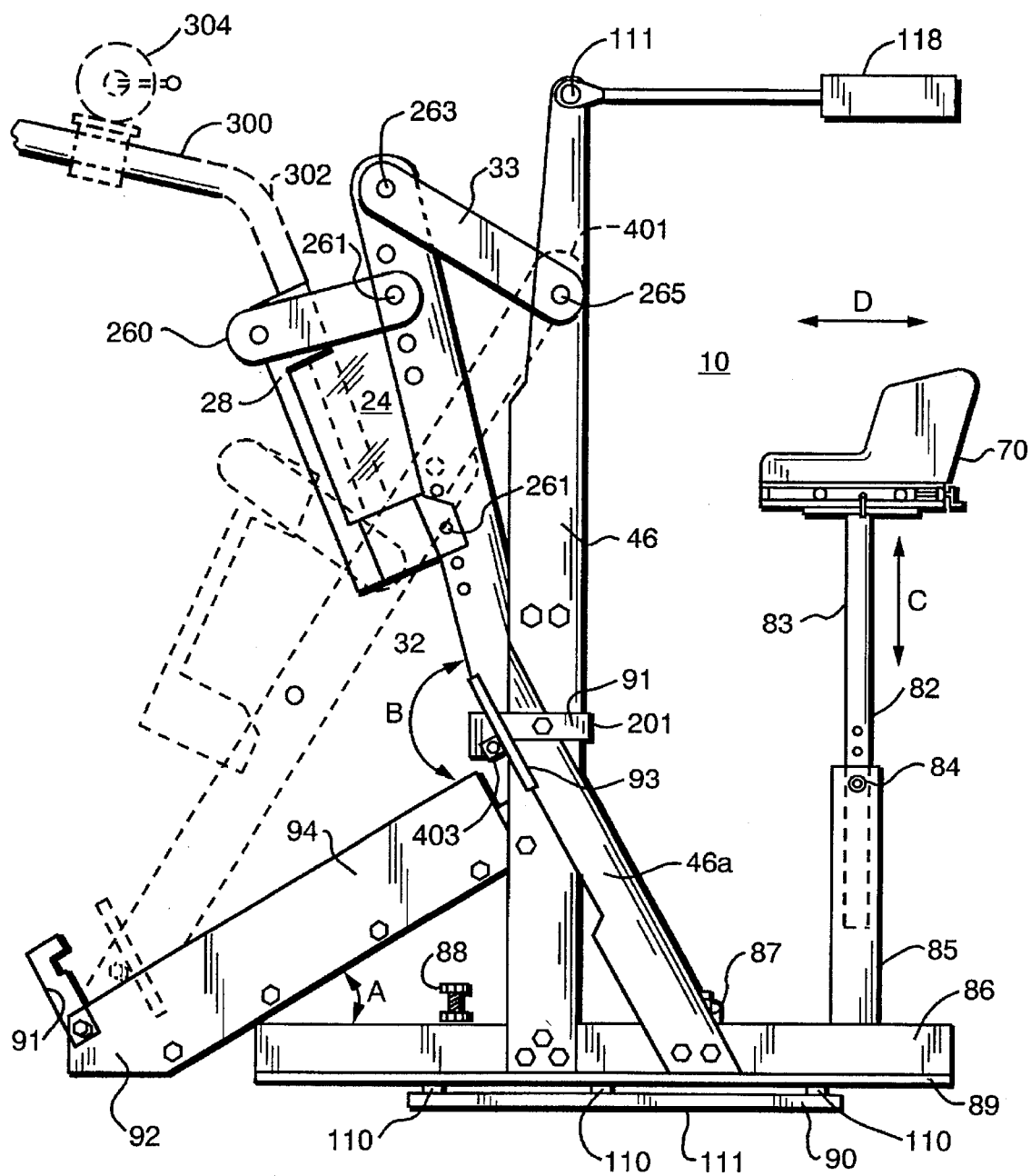
FIG. 1 is a side view of the fish fighting apparatus in accordance with the invention.

Referring now to FIG. 1, the preferred embodiment of the fish fighting apparatus is shown. The component parts of apparatus 10 can be made of any materials having sufficient strength and durability to withstand the stresses which will be encountered. Also, the materials must be able to withstand being located in an exposed marine environment. Due to its light weight and structural strength, anodized aluminum is generally preferred unless otherwise noted. The connections between one component to another can be accomplished using techniques well known and suitable for a marine environment such as bolts, machine screws, welding, epoxy, etc. The rotatable connections can be of any rotatable connection technique well known in the art, such as bearings or bushings, provided the rotatable connection selected is suitable for withstanding the rigors of long term salt water exposure.

The butt 302 of fishing rod 300 rests in rod holder support assembly 260. Rod holder support assembly 260 is shown mounted on main lever 32. Rod holder support assembly 260 is shown in its lower position using holes 261. However, if butt 302 is modified, it may be preferable to move rod holder support assembly 260 to top hole 263 so that reel will be closer to the angler for convenience. It should be recognized that rod holder support assembly 260 could easily be place anywhere along the length of main lever 32 by merely providing mounting holes in main lever 32. Main lever 32 is connected to vertical support member 46 via secondary lever 33. Secondary lever 33 is free to articulate about hole 263 and hole 265. The exact lengths of main lever 32 and secondary lever 33 are not critical. However, the greater the length of main lever 32, the higher the mechanical advantage. The length of secondary lever 33 is determined such that pedal assembly 93 can reach the bottom of inclined ramp assembly 92.

Butt 302 of rod 300 is guided into place by left butt guide 24 and a substantially identical, right butt guide (not shown). Both are preferably clear plastic so that the angler can see rod 300 as it is being placed into rod holder assembly 260. Left butt guide 24 and right butt guide (not shown) are bolted to main lever 32 as shown and rest on front support 28.

Vertical support member 46 is shown in its extended position and is supported by angle support member 46a. However, for those not wishing to use harness assembly 118, vertical support member 46 would preferably terminates at position 401, which corresponds to the attachment point of secondary lever 33.

Attached to main lever 32 is pedal assembly 93. Pedal assembly 93 rides in a track provided by inclined ramp rails 94. Vertical support member 46 is attached to main support beam 86 which is, in turn, fastened to swivel plate 89. Swivel plate 89 is connected via roller bearings 110 to deck mounting plate 111. Swivel plate and deck mounting plate 111 are bolted together via bolt 87. Also, attached to main support beam 86 is chair mounting post 85. Fitted within mounting post 85 is seat post 82. By use of ball lock pin 84, the height C of chair 70 above the deck can be easily adjusted. Chair 70 can also be adjusted in direction D as is discussed below.

In use, an angler (not shown) would adjust chair 70 in accordance with his/her arm and leg length for the most comfortable position. The angler's feet are positioned on pedal assembly 93. If desired, harness 118 is positioned around the back of the angler. Then, after a fish has been hooked, the fish is retrieved by the angler pushing with his/her legs against pedal assembly 93. The angler may also simultaneously pull on rod 300 to bring rod 300 in its most upright position (dotted lines). This corresponds to pedal assembly 93 being at its lowest sliding position on ramp assembly 92. At this position, the angler starts to reel the fish in by allowing apparatus 10 to return to its initial position. By repeating this process, the fish can be landed, with most (or virtually all, if desired) of the strength required to land the fish being supplied by the angler's legs.

Main lever 32 and secondary lever 33 are shown in their normal trolling position by the solid lines, that is, the position where pedal assembly 93 is at the top of left ramp rail 94, and in the line retrieving position by the dotted lines, that is, the position where pedal assembly 93 is at the bottom of left ramp rail 94.

When trolling for fish, pedal assembly 93 should always being in the "trolling" position. If at a lower position, the fish striking the line could cause pedal assembly to quickly "ramp" up ramp rail 94, with pedal assembly 93 potentially striking someone standing next to apparatus 10. Since apparatus 10 is designed to be used to catch fish weighing many hundreds of pounds, the force exerted by such a fish could be considerable, resulting in substantial injury to anyone in the path of pedal assembly 93. To make certain of the position of pedal assembly 93, safety latch 91 is designed to engage the axle 403 of pedal assembly 93 and hold apparatus in its trolling position. Safety latch 91 can easily be released by angler while sitting in seat 401 by merely stepping on safety latch 91 at end 201. Safety latch 91 is preferably provided on both sides, thus doubly ensuring that pedal assembly 93 is securely locked while trolling. However, a single safety latch may be used as well.

An optional safety latch 91' is provided when pedal assembly 93 is at its lower most position, that is, positioned for line retrieval. The line retrieval position is also useful when attempting to land the fish in the boat since it brings the line and the hooked fish closer to the side of the boat. However, any sudden last moment movement by the fish could cause pedal assembly 93 to rapidly slide up the ramp as discussed above. Therefore, safety latch 91' would prevent such unwanted motion. As before, safety latch 91' could be either on both sides or only on one side.

Figure 5:
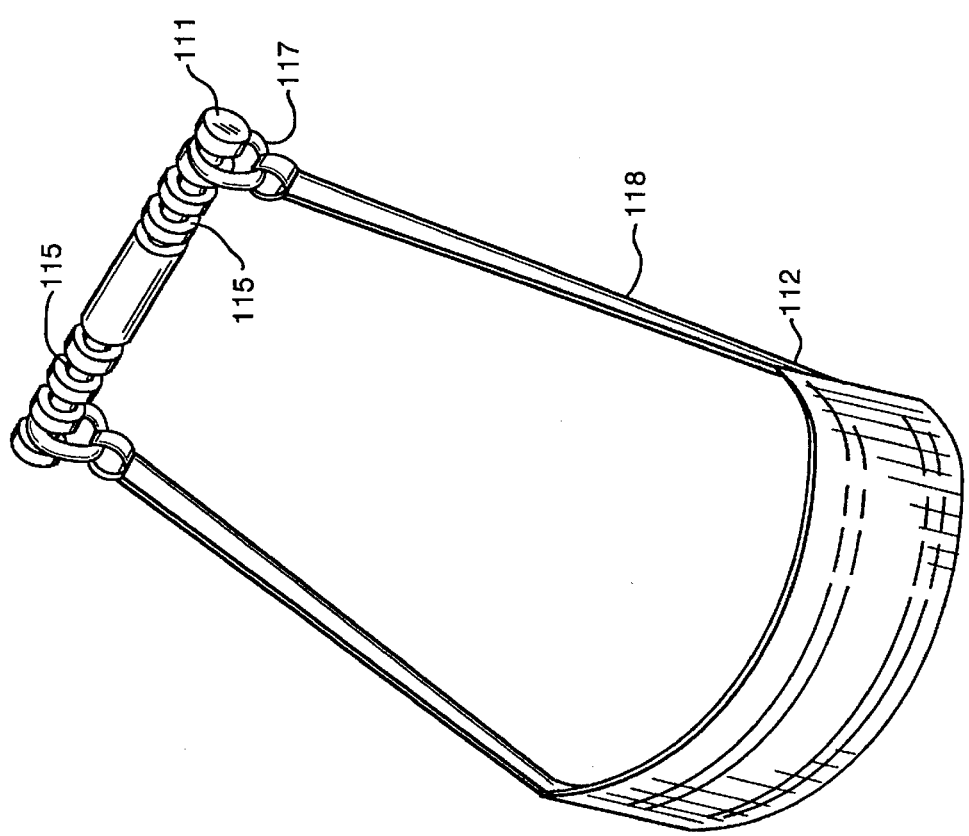
FIG. 5 is a detailed top view showing a typical harness mounted to the handle of the fish fighting apparatus.

Attached to vertical member 46 is harness assembly 118, the detail of which is shown in FIG. 5. Harness assembly 118 is attached to vertical member 46 via horizontal bar 111. Positioned along bar 111 at uniform distances from both ends are grooves 115. The dimensions of grooves 115 are not critical but should be sufficiently wide and deep so that rings 117 once slid over bar 111 will remain in positioned to hold harness 112 in position. Harness 112 can be any type of harness such as a bucket harness, kidney harness, or shoulder harness. Since harness 112 is now attached to apparatus 10 instead of reel 304, if reel 304 suddenly locks up while the fish makes a sudden dart, the angler cannot be pulled from the boat even if the rod and reel are lost.

The angle B that is formed between main lever 32 and ramp assembly 92 must be greater than 90 degrees. Otherwise, a portion of the resultant forces occurring from a vertical force applied to pedal assembly 93 would be towards the rear of apparatus 10 rather than entirely forward down the ramp assembly 92.

Further, the inventor has found that the preferable angle A formed between ramp assembly 92 and main support beam 86 is approximately 30 degrees. However, other angles could also be used.

Figure 2:
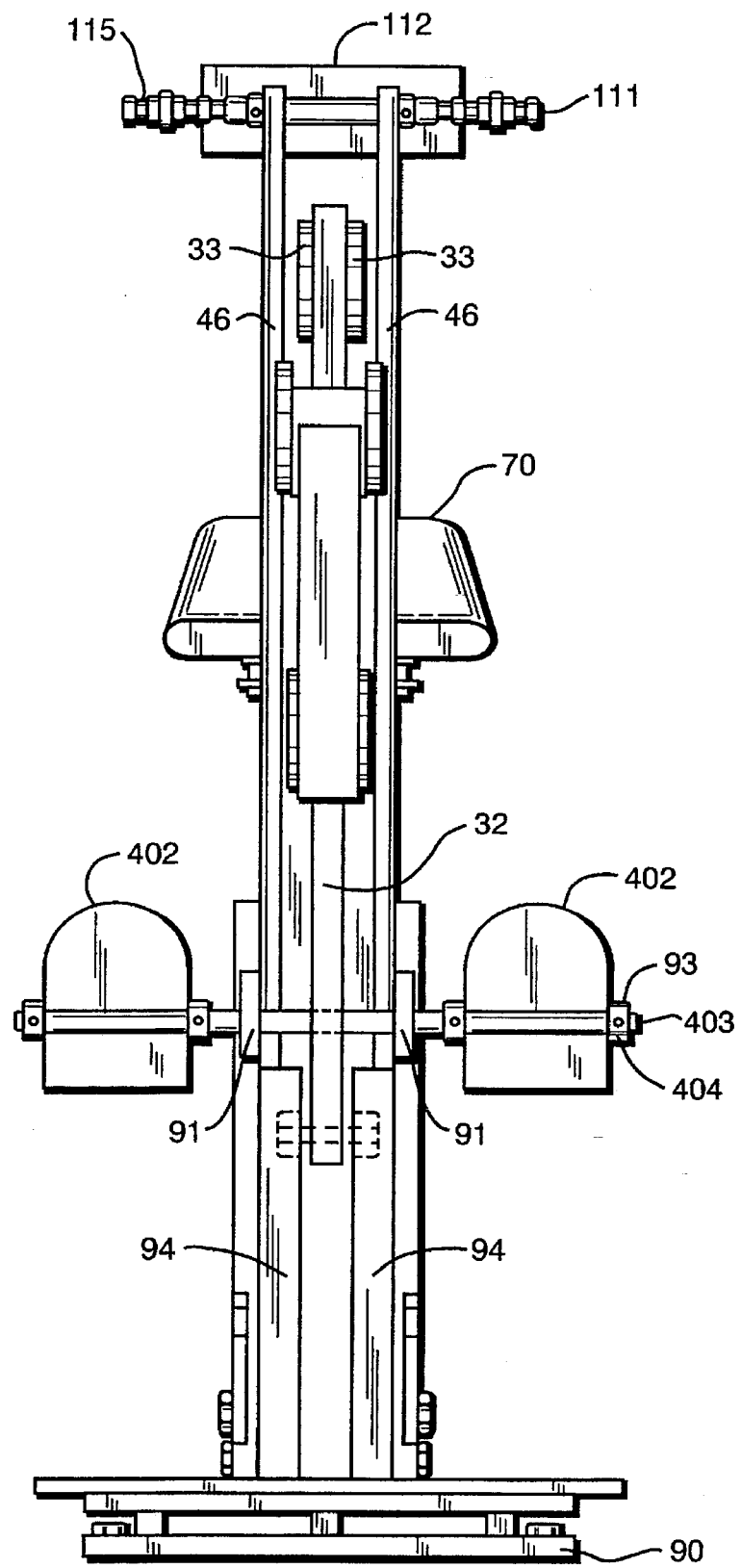
FIG. 2 is a front view of the fish fighting apparatus.

Referring now to FIG. 2, at the lower end of main lever 32 is pedal assembly 93. Pedals 402 are pivotally attached to axle 403 which is secured through lever 32. The top surfaces should be covered with any non-slip material (not shown) that is well known for use in marine environments. Pedals 402 could also be fitted with straps such as "bicycle toe clips" to provide additional security. Fittings 404 that secure pedals 402 to axle 403 are preferably provided with bearings suitable for a marine environment to ensure that pedals 402 are free to rotate. Stops (not shown) could also be provided to limit the range of motion of pedals 402 to that required during use.

Figure 3:
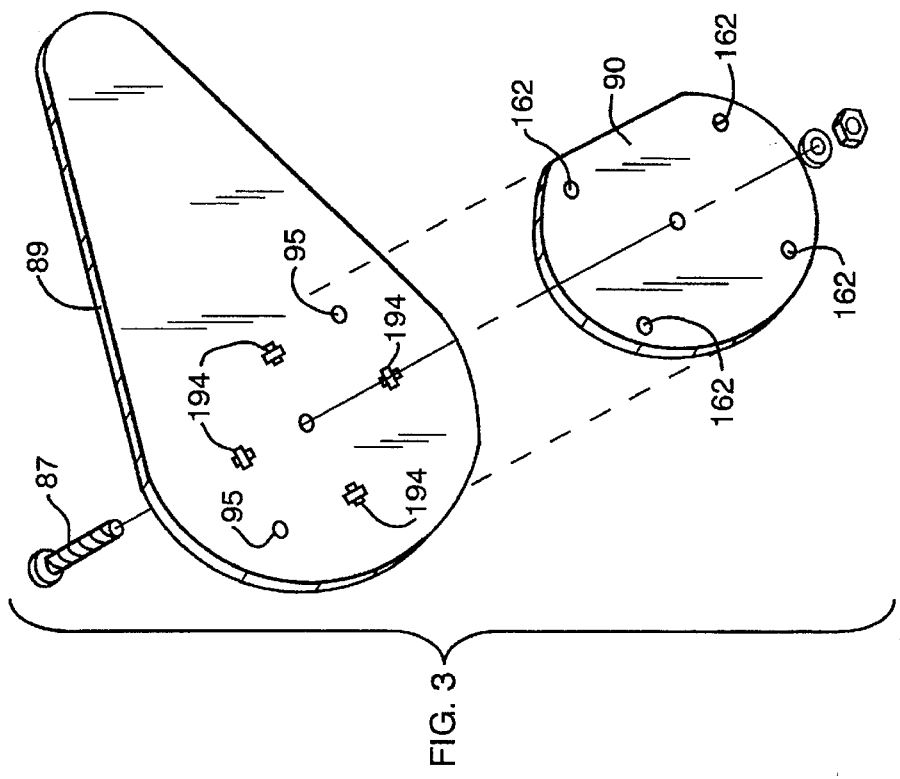
FIG. 3 is a detailed bottom view of the deck mounting assembly.

FIG. 3 is a detailed bottom view of the deck mounting assembly. Deck plate 90 is attached to the deck of the boat through holes 162. Deck plate 90 is bolted to swivel plate 89 via bolt 87. In order to be able to reach holes 162 when deck plate 90 is bolted to the deck, access holes 95 are provided in swivel plate 89. The top surface of swivel plate 89 is preferably covered with any non-slip material suitable for a marine environment. So that swivel plate 89 can be easily rotated relative to deck plate 90, either deck plate 90 or swivel plate 89 as shown are fitted with bearings 194. Bearings 194 can be any type that is suitable for use in a marine environment. Swivel plate 89 and deck plate 90 can also be fitted with stops so that swivel plate 89 cannot be rotated beyond the desired position either side of the directly aft position. While swivel plate 89 is shown having a tear drop shape, this is not required. A simple circular shape would also be suitable.

When apparatus 10 is not being used, the motion of seaway could cause apparatus 10 to swivel violently since the force to cause apparatus 10 to rotate is small due to bearings 194. Therefore, as shown in FIG. 9, the deck mounting assembly is fitted with a drag pressure pad assembly 900 which can adjust the rotational friction. Main beam 86 and swivel plate 89 are fitted with opening 908 which houses assembly 900. Bolt 902 is attached to compression plate 910 and held in place by locking nuts 904 and 906. Once nuts 904 and 906 are tightened against one another, the position of bolt 902 will be securely fixed. Compression plate 910 compresses spring 912 which urges friction pad 914 against deck plate 90. If it is desired to lock swivel plate rigidly in position, for example, in the situation where the boat is in a severe storm, nut 906 would be merely tightened further, then locked using nut 904. A variety of methods would be equally suitable to adjust the force necessary to rotate swivel plate 89. For example, rather than nuts 904 and 906, a knurled wheel arrangement could be provided that would permit adjustment by merely turning the wheel.

Figure 4:
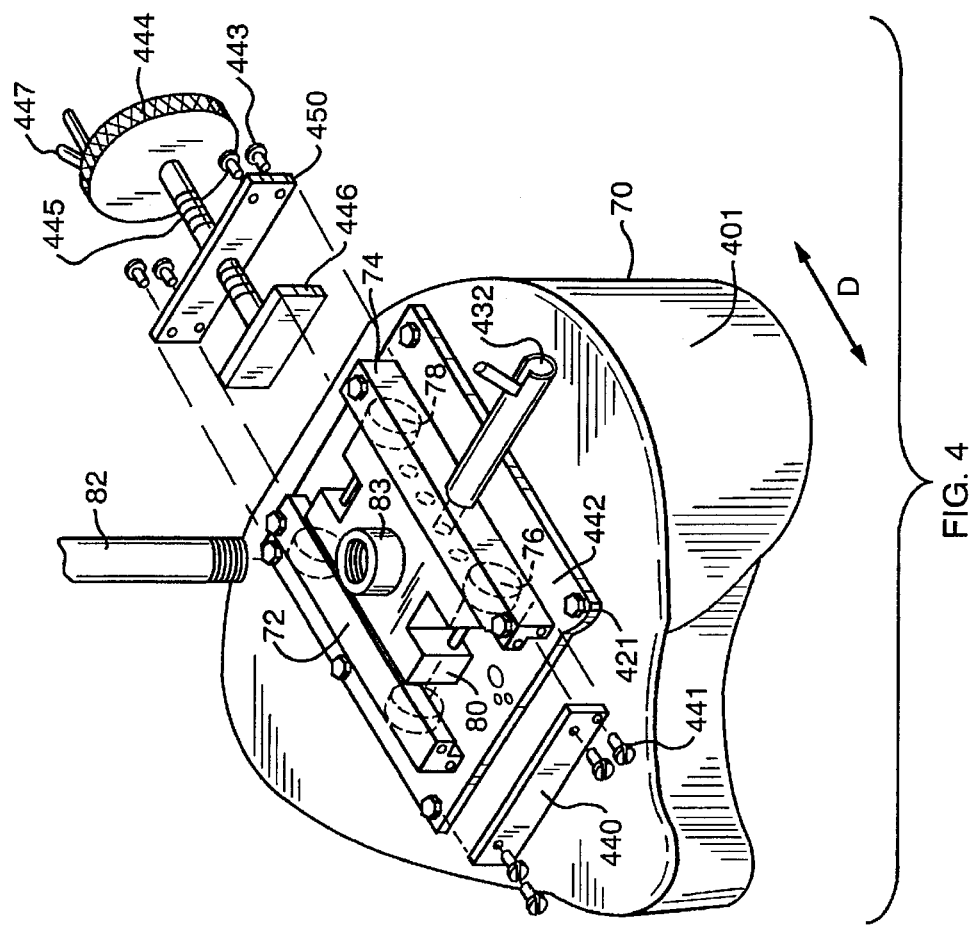
FIG. 4 is a detailed bottom view of the sliding chair assembly.

FIG. 4 is a detailed bottom view of the sliding chair assembly 70. As shown, seat 401, which is constructed of materials well known in the art, preferably has a "motorcycle" shape to permit the unrestricted use of his/her legs. Plate 442 is attached by screws 421 to seat 401. Attached to plate 442 is left seat rail 72 and right seat rail 74. Left seat rail 72 and right seat rail 74 slideably contain front seat roller 76 and rear seat roller 78. Material selection is not critical but must be suitable for a marine environment. Front seat roller 76 and rear seat roller 78 are rotatably attached to center seat rail carriage 80. Center seat rail carriage 80 is attached to seat stanchion 82 via threaded collar 83. In this manner, seat 401 can be adjusted fore and aft along direction D so that anglers with varying leg lengths can be easily accommodated. Once seat 401 is placed at the proper distance from main lever 32, it can be locked into position using spring locking pin 432 so that an angler can be supported against the back of seat 401 when the angler's legs are pushing on pedals 402. Also, seat 401 could be fitted with straps (not shown) so that the angler can be held firmly within seat 401 when fighting a fish. In this manner, the full strength of the angler's arms can be applied against rod 300 and the full strength of the angler's legs can be applied against main lever 32. Therefore, by using the complete body strength of the angler in combination with the significant mechanical advantage provided by the lever, the angler can haul in even the largest fish with very little effort.

If the angler prefers, seat 401 may be left free to slide so that the angler can use a combination of the angler's body weight and the partial strength of the angler's arms and legs to pull in the fish. Plate 440 which is attached to left and right rails 72 and 74 via screws 441 prevent seat 401 from leaving the track in the forward position. The permissible travel of seat 401 can be adjusted using assembly 447. Assembly 447 consists of plate 446 which serves as stop against carriage 80. Plate 446 is attached to wheel 444 via axle 445. Plate 450 bolts assembly 447 to left and right rails 72, 74 via screws 443. By merely turning wheel 444, threaded axle 445 moves plate 446 closer or further away from the rear of mounting plate 442 to adjust the maximum sliding movement of seat 401.

FIG. 8 shows how the vertical adjustment of seat assembly 70 is provided. Seat post 82 is dimensioned to slide within mounting post 85. To prevent salt water from running inside mounting post 85, it is fitted with 0-ring seal 464. Mounting post 85 is mounted to main beam 86 and swivel plate 89 via bolt 462. Seat post 82 is fitted with a number of adjustment openings 471. To change the height of chair 401, the angler merely removes ball lock pin 84, aligns the desired opening 471 with the opening in mounting post 85 and re-inserts pin 84. While a "ball lock" type of pin is shown, any of the variety of such devices well known in the art would work just as well.

Figure 6:
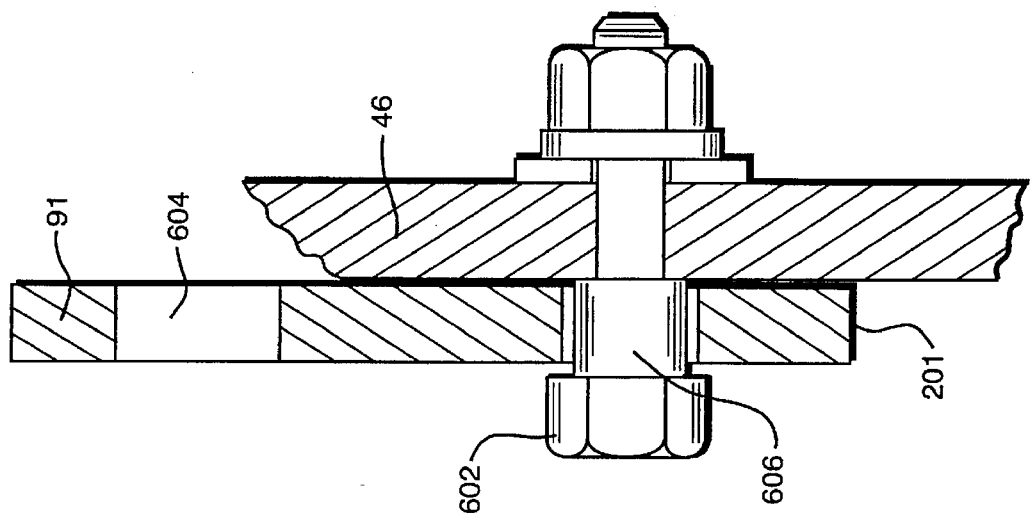
FIG. 6 is a cross-sectional view of the foot pedal safety latch.

FIG. 6 is a cross-sectional view of the foot pedal safety latch 91. Latch 91 is attached to vertical support 46 via bolt assembly 602. Latch 91 is fitted with notch 604 that is dimensioned so that it corresponds to the diameter of axle 403. Sleeve 606 is fitted around bolt assembly 602 so that latch 91 can be easily rotated. As noted above, once in position, latch 91 can be released by the angler by merely pressing on region 201.

FIG. 7 is a detailed perspective exploded view of the inclined ramp assembly 92 with part of the foot pedal assembly showing the foot pedal assembly in its track. Rollers 704 are attached to main lever 32 via axle 710 which is locked into position by bolt 708. Rollers 704 are preferably a material that will withstand repeated exposure to salt water such DELRIN. However, other materials would also be suitable. The track for rollers 704 are formed by left and right ramps 94 which are bolted to base 712 via bolts 716.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A fish fighting apparatus for assisting an angler in pulling a hooked fish into a boat using a fishing rod having a butt and a reel, said apparatus comprising:

a base having a top surface and a bottom surface which attaches said apparatus to the deck of the boat;

a chassis having a top surface and a bottom surface that is rotatably connected to the top surface of said base, wherein said chassis can be rotated substantially independent of the pull on the fishing rod;

vertical support member rigidly fastened to said chassis;

an inclined ramp having an upper position and a lower position, said ramp rigidly fastened to said vertical support member;

a lever, having a pivotal end and a ramp end, with the pivotal end of said lever being pivotally attached to said vertical member;

a pedal assembly attached to the ramp end of said lever with said pedal assembly slidably attached to said inclined ramp;

rod holder adjustably attached to said lever, said rod holder releasably holding the butt of the rod so that the angle between the fishing rod and the boat can be set to a predetermined position and so that the fishing rod can be set at a predetermined distance relative to said vertical member; wherein force applied to said pedal assembly causes said pedal assembly to slide down from the upper position of said ramp to the lower position of said ramp, such that a mechanical advantage is achieved, thus, enabling the angler to pull the hooked fish toward the boat using the mechanical advantage provided by said lever.

2. The fish fighting apparatus of claim 1, wherein said lever further comprises:

at least two positions of attachment for said rod holder.

3. The fish fighting apparatus of claim 1, wherein said inclined ramp is inclined approximately 30 degrees.

4. The fish fighting apparatus of claim 1 further comprising a plurality of bearings, attached between the top surface of said base and the bottom surface of said chassis, for reducing rotational friction between said surfaces.

5. The fish fighting apparatus of claim 4 wherein said chassis further comprises a drag assembly to adjust the force necessary to rotate said chassis on said base.

6. The fish fighting apparatus of claim 1 further comprising an adjustable seat assembly attached to said chassis.

7. The fish fighting apparatus of claim 6 wherein said seat assembly is attached to said chassis via an adjustable post.

8. The fish fighting apparatus of claim 7 wherein the point of attachment of said adjustable post is distant from the point of rotation of said chassis.

9. The fish fighting apparatus of claim 8 wherein said seat assembly further comprises a seat that is slidably adjustable relative to the position of said post.

10. The fish fighting apparatus of claim 9 wherein said slidable adjustable position of said seat relative to said post can be releasably locked.

11. The fish fighting apparatus of claim 1 wherein said inclined ramp further comprises a track, said track having a bearing surface, and wherein said pedal assembly further comprising at least one bearing dimensioned to ride in said track.

12. The fish fighting apparatus of claim 1 further comprising a safety latch attached to said vertical support for releasably holding said pedal assembly in the upper position on said inclined ramp.

13. The fish fighting apparatus of claim 1 further comprising a safety latch attached to said inclined ramp for releasably holding said pedal assembly in the lower position on said inclined ramp.

14. The fish fighting apparatus of claim 1 further comprising an incline angle between said lever and said inclined ramp when said pedal assembly is in its upper position on said inclined ramp, and wherein said incline angle is always greater than 90 degrees.

* * * * *